US012443416B2

(12) United States Patent
Martin et al.

(10) Patent No.: US 12,443,416 B2
(45) Date of Patent: Oct. 14, 2025

(54) DISTRIBUTED GEOMETRY

(71) Applicant: Advanced Micro Devices, Inc., Santa Clara, CA (US)

(72) Inventors: Todd Martin, Orlando, FL (US); Tad Robert Litwiller, Orlando, FL (US); Nishank Pathak, Orlando, FL (US); Randy Wayne Ramsey, Orlando, FL (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 50 days.

(21) Appl. No.: 18/363,333

(22) Filed: Aug. 1, 2023

(65) Prior Publication Data

US 2023/0376318 A1    Nov. 23, 2023

Related U.S. Application Data

(63) Continuation of application No. 17/489,059, filed on Sep. 29, 2021, now Pat. No. 11,755,336.

(51) Int. Cl.
*G06F 9/4401* (2018.01)
*G06F 9/30* (2018.01)
*G06F 9/54* (2006.01)

(52) U.S. Cl.
CPC .......... *G06F 9/4411* (2013.01); *G06F 9/3009* (2013.01); *G06F 9/544* (2013.01)

(58) Field of Classification Search
CPC ....... G06F 9/4411; G06F 9/3009; G06F 9/544
(Continued)

(56) References Cited

U.S. PATENT DOCUMENTS 4,434,461 A    2/1984  Puhl
4,965,750 A *  10/1990 Matsuo ............... G06T 17/00
                                                     345/565

(Continued)

FOREIGN PATENT DOCUMENTS

JP    05266201 A    10/1993
JP    2001167075 A   6/2001
WO    2007132746 A1  11/2007

OTHER PUBLICATIONS

Islam, et al., "Improving Node-Level MapReduce Performance using Processing-in-Memory Technologies", European Conference on Parallel Processing, 12 pages, https://csrl.cse.unt.edu/kavi/Research/UCHPC-2014.pdf. [Retrieved Mar. 29, 2021].

(Continued)

*Primary Examiner* — Paul R. Myers
(74) *Attorney, Agent, or Firm* — Kowert, Hood, Munyon, Rankin & Goetzel, P.C.; Rory D. Rankin

(57) ABSTRACT

Systems, apparatuses, and methods for performing geometry work in parallel on multiple chiplets are disclosed. A system includes a chiplet processor with multiple chiplets for performing graphics work in parallel. Instead of having a central distributor to distribute work to the individual chiplets, each chiplet determines on its own the work to be performed. For example, during a draw call, each chiplet calculates which portions to fetch and process of one or more index buffer(s) corresponding to one or more graphics object(s) of the draw call. Once the portions are calculated, each chiplet fetches the corresponding indices and processes the indices. The chiplets perform these tasks in parallel and independently of each other. When the index buffer(s) are processed, one or more subsequent step(s) in the graphics rendering process are performed in parallel by the chiplets.

20 Claims, 11 Drawing Sheets

(58) Field of Classification Search
USPC .......................................................... 713/2
See application file for complete search history.

(56) References Cited

U.S. PATENT DOCUMENTS

| | | | | |
|---|---|---|---|---|
| 4,967,375 A * | 10/1990 | Pelham | ................... | G06T 17/00 345/501 |
| 5,159,320 A * | 10/1992 | Matsuo | ................... | G09G 5/02 345/600 |
| 5,276,780 A * | 1/1994 | Sugiura | ................... | G06F 16/93 345/531 |
| 6,166,724 A * | 12/2000 | Paquette | ................... | G09G 5/06 345/589 |
| 6,233,599 B1 | 5/2001 | Nation et al. | | |
| 6,362,828 B1 * | 3/2002 | Morgan | ................ | G06T 15/005 345/611 |
| 6,636,224 B1 * | 10/2003 | Blythe | ................ | G06T 15/005 345/545 |
| 7,015,914 B1 * | 3/2006 | Bastos | ..................... | G06T 1/20 345/506 |
| 7,477,266 B1 * | 1/2009 | Bastos | ................... | G06T 11/60 345/582 |
| 8,730,248 B2 | 5/2014 | Sasaki et al. | | |
| 11,016,929 B2 | 5/2021 | Ray et al. | | |
| 11,755,336 B2 * | 9/2023 | Martin | ................... | G06F 9/3009 713/2 |
| 2002/0015039 A1 * | 2/2002 | Moore | ................... | G06T 15/40 345/629 |
| 2004/0236874 A1 * | 11/2004 | Largman | ................ | G06F 21/71 710/8 |
| 2004/0257622 A1 | 12/2004 | Shibaki et al. | | |
| 2005/0041031 A1 * | 2/2005 | Diard | ..................... | G09G 5/393 345/505 |
| 2005/0204015 A1 * | 9/2005 | Steinhart | ............... | G06F 3/1454 709/217 |
| 2008/0001960 A1 | 1/2008 | Chen | | |
| 2008/0313589 A1 | 12/2008 | Maixner et al. | | |
| 2010/0049477 A1 * | 2/2010 | Sivan | ..................... | G06F 30/13 703/1 |
| 2013/0021360 A1 | 1/2013 | Gruber | | |
| 2014/0176588 A1 * | 6/2014 | Duluk, Jr. | ............. | G09G 5/001 345/541 |
| 2014/0362102 A1 | 12/2014 | Cerny et al. | | |
| 2015/0039860 A1 | 2/2015 | Sundar et al. | | |
| 2015/0145880 A1 | 5/2015 | Smith et al. | | |
| 2016/0104264 A1 | 4/2016 | Arulesan et al. | | |
| 2017/0178401 A1 | 6/2017 | Agrawal et al. | | |
| 2018/0024938 A1 | 1/2018 | Paltashev et al. | | |
| 2018/0300933 A1 | 10/2018 | Burke et al. | | |
| 2019/0236749 A1 | 8/2019 | Gould et al. | | |
| 2020/0074726 A1 * | 3/2020 | Gierach | ................... | G06F 17/16 |
| 2020/0151926 A1 * | 5/2020 | Uhrenholt | ................. | G06T 1/20 |
| 2021/0142438 A1 * | 5/2021 | Appu | ..................... | G06F 9/3818 |
| 2021/0263853 A1 | 8/2021 | Waters et al. | | |
| 2022/0139021 A1 | 5/2022 | Frisinger et al. | | |
| 2023/0097097 A1 | 3/2023 | Martin | | |

OTHER PUBLICATIONS

Nyasulu, Peter M., "System Design for a Computational-RAM Login-In-Memory Parallel Processing Machine", PhD Thesis, May 1999, 196 pages, https://central.bac-lac.gc.ca/.item?id=NQ42803 &op=pdf&app=Library&oclc_number=1006659158. [Retrieved Mar. 29, 2021].

Pugsley, et al. "NDC: Analyzing the impact of 3D-stacked Memory+ Logic Devices on MapReduce Workloads", 2014 IEEE International Symposium on Performance Analysis of Systems and Software (ISPASS), Mar. 2014, pp. 190-200, https://www.researchgate.net/publication/269302127_NDC_Analyzing_the_impact_of_3D-stacked_memorylogic_devices_on_MapReduce_workloads/link/5c88489fa6fdcc38174f961e/download. [Retrieved Mar. 29, 2021].

Yang et al., "A Processing-in-Memory Architecture Programming Paradigm for Wireless Internet-of-Things Applications", Sensors Journal, Jan. 2019, 23 pages, https://pdfs.semanticscholar.org/81cd/bda211fd479c23de2213fb610b484548cb01.pdf?_ga=2.58956461.1037489400.1617057589-1017129252.1617057589. [Retrieved Mar. 29, 2021].

Alexander, Esther C., "MPC8240 and MPC8245: Comparison and Compatibility", Freescale Semiconductor, Inc., Document No. AN2128, Oct. 2006, 28 pages, Revision 5, https://www.nxp.com/docs/en/application-note/AN2128.pdf. [Retrieved Jun. 9, 2021].

"Intel® Pentium® 4 Processor-Based System Integration Overview for Processors" Intel, Dec. 21, 2015, 7 pages, https://www.intel.co.uk/content/www/uk/en/support/processors/desktop-processors/000006865.html. [Retrieved Jun. 9, 2021].

Kalamatianos et al., U.S. Appl. No. 17/139,496, entitled "Reusing Remote Registers in Processing in Memory", filed Dec. 31, 2020, 28 pages.

International Search Report and Written Opinion in International Application No. PCT/US2022/077848, mailed Feb. 2, 2023, 11 pages.

Dong et al., U.S. Appl. No. 17/499,494, entitled "Duplicated Registers in Chiplet Processing Units", filed Oct. 12, 2021, 33 pages.

International Search Report and Written Opinion in International Application No. PCT/US2022/076223, mailed Jan. 11, 2023, 10 pages.

Office Action in Japanese Application No. 2024-518308 dated May 13, 2025, 14 pages.

* cited by examiner

| Physical Tessellator ID 810 | Logical Tessellator ID 815 | Patches Owned 820 |
|---|---|---|
| 0 | 3 | 18-23 |
| 1 | 0 | 0-5, 24-29 |
| 2 | 1 | 6-11, 30-31 |
| 3 | 2 | 12-17 |

905
                   /
        ┌─────────────────────────────┐
        │   Receive, by a First Geometry│
        │  Engine, an Indication of a Draw Call│
        │    being Initiated along with an│
        │ Address and Size of an Index Buffer│
        │ corresponding to a Graphics Object│
        │           of the Draw Call   │
        └─────────────────────────────┘
                      │
                      ▼    910
                           /
        ┌─────────────────────────────┐
        │  Calculate which Portions of the│
        │ Index Buffer to Fetch based on One│
        │        or More Parameters    │
        └─────────────────────────────┘
                      │
                      ▼    915
                           /
        ┌─────────────────────────────┐
        │ Fetch the Identified Portions of the│
        │           Index Buffer       │
        └─────────────────────────────┘
                      │
                      ▼    920
                           /
        ┌─────────────────────────────┐
        │ Process the Identified Portions of│
        │   the Index Buffer Until the Last│
        │    Identified Portion has been│
        │             Processed        │
        └─────────────────────────────┘
```

FIG. 9

DISTRIBUTED GEOMETRY

BACKGROUND

Description of the Related Art

A graphics processing unit (GPU) processes three-dimensional (3-D) graphics using a graphics pipeline formed of a sequence of programmable shaders and fixed-function hardware blocks. For example, a 3-D model of an object that is visible in a frame can be represented by a set of triangles, other polygons, or patches which are processed in the graphics pipeline to produce values of pixels for display to a user. The triangles, other polygons, or patches are collectively referred to as primitives. Graphics processing of the primitives typically involves many steps performed in serial fashion on the GPU. However, this serial processing increases the latency of rendering graphics and reduces performance.

BRIEF DESCRIPTION OF THE DRAWINGS

The advantages of the methods and mechanisms described herein may be better understood by referring to the following description in conjunction with the accompanying drawings, in which:

FIG. 8 is a diagram of one implementation of a tessellator-to-patch mapping table.

FIG. 9 is a generalized flow diagram illustrating one implementation of a method for performing distributed geometry work without a central distributor.

DETAILED DESCRIPTION OF IMPLEMENTATIONS

In the following description, numerous specific details are set forth to provide a thorough understanding of the methods and mechanisms presented herein. However, one having ordinary skill in the art should recognize that the various implementations may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

Various systems, apparatuses, and methods for performing geometry work in parallel on multiple chiplets are disclosed herein. In one implementation, a system includes a chiplet processor with multiple chiplets for performing graphics work in parallel. Instead of having a central distributor to distribute work to the individual chiplets, each chiplet determines on its own the work to be performed. For example, during a draw call, each chiplet calculates which portions to fetch and process of one or more index buffer(s) corresponding to one or more graphics object(s) of the draw call. Once the portions are calculated, each chiplet fetches the corresponding indices and processes the indices. The chiplets perform these tasks in parallel and independently of each other. When the index buffer(s) are processed, one or more subsequent step(s) in the graphics rendering process are performed in parallel by the chiplets.

Figure 1:
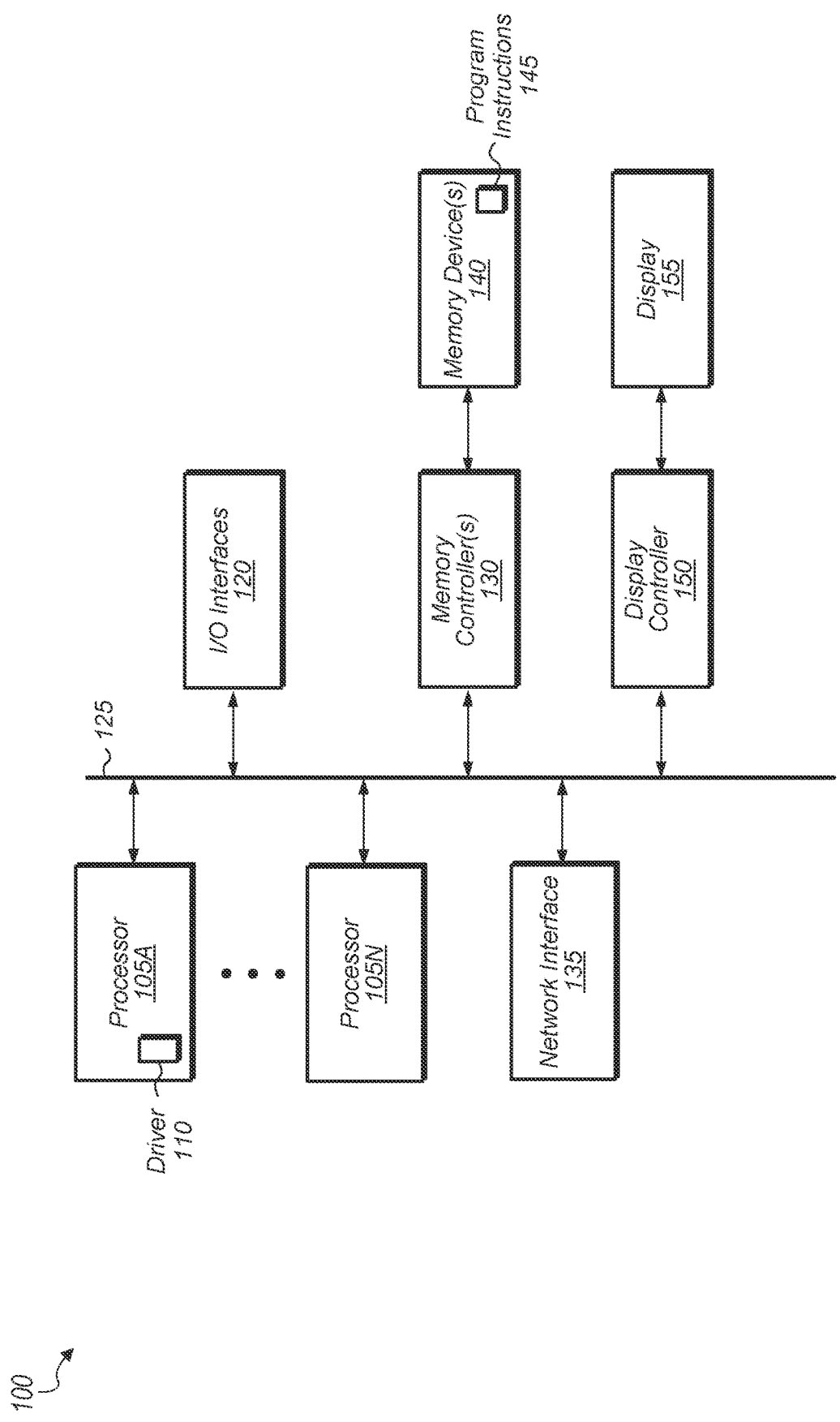
FIG. 1 is a block diagram of one implementation of a computing system.

Referring now to FIG. 1, a block diagram of one implementation of a computing system 100 is shown. In one implementation, computing system 100 includes at least processors 105A-N, input/output (I/O) interfaces 120, bus 125, memory controller(s) 130, network interface 135, memory device(s) 140, display controller 150, and display 155. In other implementations, computing system 100 includes other components and/or computing system 100 is arranged differently. Processors 105A-N are representative of any number of processors which are included in system 100.

In one implementation, processor 105A is a general purpose processor, such as a central processing unit (CPU). In this implementation, processor 105A executes a driver 110 (e.g., graphics driver) for communicating with and/or controlling the operation of one or more of the other processors in system 100. It is noted that depending on the implementation, driver 110 can be implemented using any suitable combination of hardware, software, and/or firmware. In one implementation, processor 105N is a data parallel processor with a highly parallel architecture, such as a chiplet graphics processing unit (GPU) which processes data, executes parallel processing workloads, renders pixels for display controller 150 to drive to display 155, and/or executes other workloads.

A chiplet GPU is a complex integrated circuit that performs graphics-processing tasks across multiple semiconductor dies. GPUs can execute graphics-processing tasks required by an end-user application, such as a video-game application. GPUs are also increasingly being used to perform other tasks which are unrelated to graphics. Other data parallel processors that can be included in system 100 include digital signal processors (DSPs), field programmable gate arrays (FPGAs), application specific integrated circuits (ASICs), and so forth. In some implementations, processors 105A-N include multiple data parallel processors.

Memory controller(s) 130 are representative of any number and type of memory controllers accessible by processors 105A-N. While memory controller(s) 130 are shown as being separate from processors 105A-N, it should be understood that this merely represents one possible implementation. In other implementations, a memory controller 130 can be embedded within one or more of processors 105A-N and/or a memory controller 130 can be located on the same semiconductor die as one or more of processors 105A-N. Memory controller(s) 130 are coupled to any number and type of memory devices(s) 140.

Memory device(s) 140 are representative of any number and type of devices containing memory and/or storage elements. For example, the type of memory in memory device(s) 140 includes Dynamic Random Access Memory (DRAM), Static Random Access Memory (SRAM), NAND Flash memory, NOR flash memory, Ferroelectric Random Access Memory (FeRAM), or others. Memory device(s) 140 store program instructions 145, which can include a first set of program instructions for an application, a second set of program instructions for a driver component, and so on. Alternatively, program instructions 145, or a portion thereof, can be stored in a memory or cache device local to processor 105A and/or processor 105N.

I/O interfaces 120 are representative of any number and type of I/O interfaces (e.g., peripheral component interconnect (PCI) bus, PCI-Extended (PCI-X), PCIE (PCI Express) bus, gigabit Ethernet (GBE) bus, universal serial bus (USB)). Various types of peripheral devices (not shown) are coupled to I/O interfaces 120. Such peripheral devices include (but are not limited to) displays, keyboards, mice, printers, scanners, joysticks or other types of game controllers, media recording devices, external storage devices, and so forth. Network interface 135 is able to receive and send network messages across a network.

In various implementations, computing system 100 is a computer, laptop, mobile device, game console, server, streaming device, wearable device, or any of various other types of computing systems or devices. It is noted that the number of components of computing system 100 varies from implementation to implementation. For example, in other implementations, there are more or fewer of each component than the number shown in FIG. 1. It is also noted that in other implementations, computing system 100 includes other components not shown in FIG. 1. Additionally, in other implementations, computing system 100 is structured in other ways than shown in FIG. 1.

Figure 2:
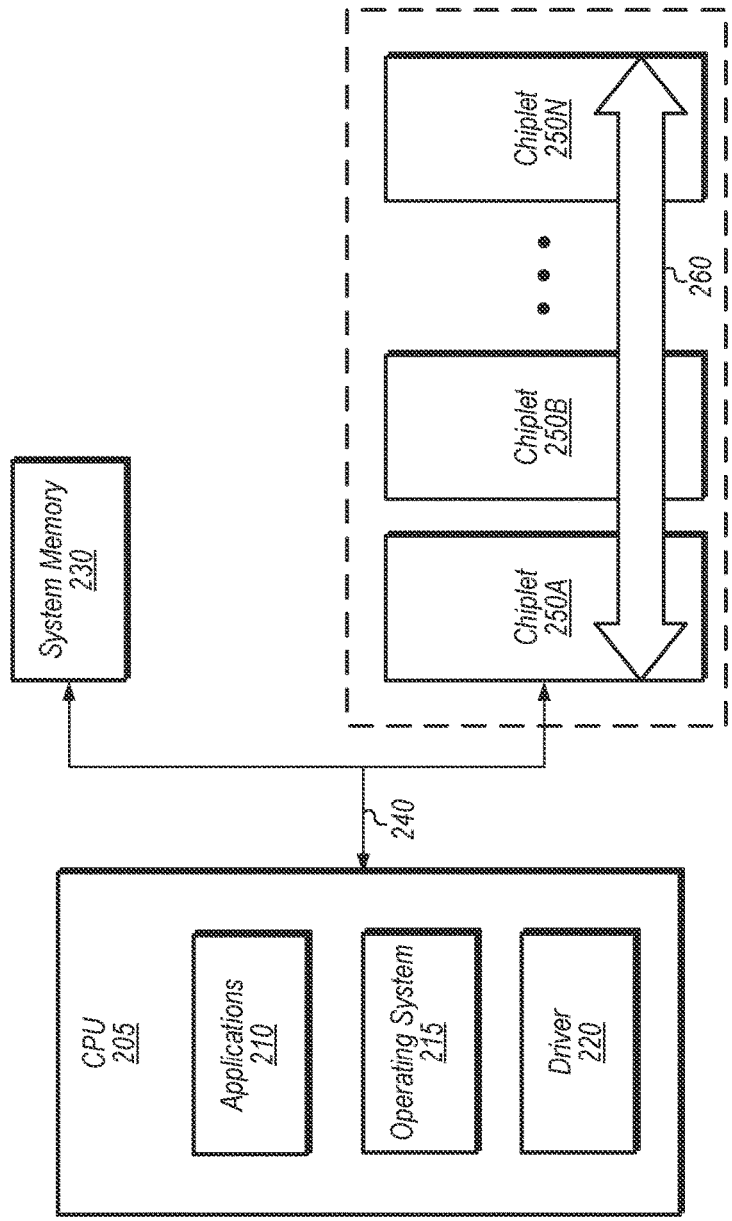
FIG. 2 is a block diagram of a processing system employing GPU chiplets in accordance with some implementations.

Turning now to FIG. 2, a block diagram illustrating a processing system 200 employing GPU chiplets in accordance with some implementations is shown. Processing system 200 can be any of the previously listed devices or systems, such as a computer, laptop, server, supercomputer, mobile device, or otherwise. Processing system 200 may also be a subsystem which is incorporated into other devices or systems. Any of various other types of devices, systems, or subsystems are possible and are contemplated.

In the depicted example, the system 200 includes a central processing unit (CPU) 205 for executing instructions and an array of one or more GPU chiplets, such as GPU chiplets 250A, 250B, and through 250N (collectively, GPU chiplets 250). It is noted that system 200 can include any number of other components (e.g., voltage regulator(s), memory device (s), network interface(s), peripheral device(s)) which are not shown to avoid obscuring the figure. In various implementations, and as used herein, the term "chiplet" refers to any device including, but not limited to, the following characteristics: 1) a chiplet includes an active silicon die containing part of the computational logic used to solve a full problem (i.e., the computational workload is distributed across multiples of these active silicon dies); 2) chiplets are packaged together as a monolithic unit on the same substrate; and 3) the programming model preserves the concept that these separate computational dies are a single monolithic unit (i.e., each chiplet is not exposed as a separate device to an application that uses the chiplets for processing computational workloads).

In various implementations, the CPU 205 is connected via a bus 240 to a system memory 230, such as a dynamic random access memory (DRAM). In various implementations, the system memory 230 can also be implemented using other types of memory including static random access memory (SRAM), nonvolatile RAM, and the like. In the illustrated implementation, the CPU 205 communicates with the system memory 230 and also the GPU chiplets 250 over bus 240 that is implemented as a peripheral component interconnect (PCI) bus, PCI-E bus, or other type of bus. However, some implementations of the system 200 include the GPU chiplets 250 communicating with the CPU 205 over a direct connection or via other buses, bridges, switches, routers, and the like.

As illustrated, the CPU 205 includes a number of processes, such as one or more application(s) 210 to generate graphic commands and a user mode driver 220 (or other drivers, such as a kernel mode driver). In various implementations, the one or more applications 210 include applications that utilize the functionality of the GPU chiplets 250, such as applications that generate work in the system 200 or an operating system (OS) 215. An application 210 may include one or more graphics instructions that instruct the GPU chiplets 250 to render a graphical user interface (GUI) and/or a graphics scene. For example, the graphics instructions may include instructions that define a set of one or more graphics primitives to be rendered by the GPU chiplets 250.

In some implementations, the application 210 utilizes a graphics application programming interface (API) to invoke a user mode driver 220 (or a similar GPU driver). In one implementation, user mode driver 220 issues one or more commands to the array of one or more GPU chiplets for rendering one or more graphics primitives into displayable graphics images. Based on the graphics instructions issued by application 210 to the user mode driver 220, the user mode driver 220 formulates one or more graphics commands that specify one or more operations for GPU chiplets to perform for rendering graphics. In some implementations, the user mode driver 220 is a part of the application 210 running on the CPU 205. For example, the user mode driver 220 may be part of a gaming application running on the CPU 205. Similarly, a kernel mode driver (not shown) may be part of OS 215 running on the CPU 205.

In the depicted implementation of FIG. 2, a communication link 260 (e.g., crosslink 260) connects the GPU chiplets 250 (i.e., GPU chiplets 250A through 250N) to each other. It is noted that the number of GPU chiplets in the chiplet array is a matter of design choice and may vary from implementation to implementation. In various implementations, the crosslink 260 is a bus, an interconnect chip such as a high density crosslink (HDCL) die interposer, or other inter-chiplet communications mechanism.

Figure 3:
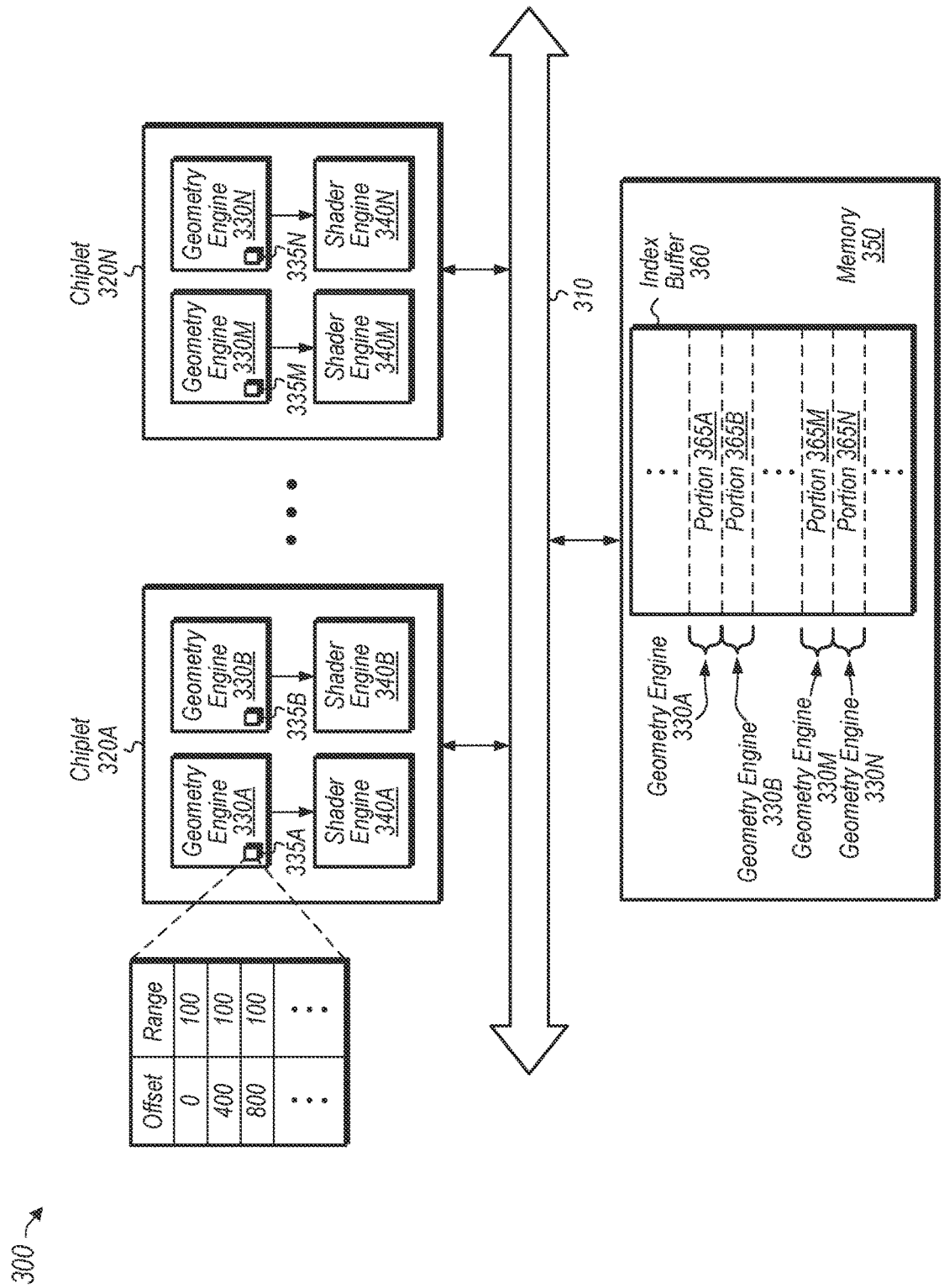
FIG. 3 is a block diagram of one implementation of a GPU.

Referring now to FIG. 3, a block diagram of one implementation of a GPU 300 is shown. Depending on the implementation, GPU 300 can be included in any of various types of devices or systems, such as a computer, laptop, server, supercomputer, mobile device, tablet, or otherwise. Computing system 300 may also be a subsystem which is incorporated into other devices or systems. Any of various other types of devices, systems, or subsystems are possible and are contemplated.

As shown, GPU 300 is a chiplet GPU with multiple chiplets 320A-N. The number of chiplets 320A-N in GPU 300 varies according to the implementation. For example, in a first implementation, GPU 300 includes four chiplets 320A-N, in a second implementation GPU 300 includes eight chiplets 320A-N, in a third implementation GPU 300 includes 12 chiplets 320A-N, and so on. Chiplets 320A-N are coupled to each other via communication link 310 which can include any combination of bus, communication fabric, or other types of interfaces. In one implementation, chiplets 320A-N are coupled to index buffer 360 stored in memory 350 via communication link 310. It is noted that chiplets 320A-N can be coupled to any number and type of other components via communication link 310.

Each chiplet 320A-N includes any number (i.e., from 1 to N, where N is a positive integer) of corresponding geometry engines 330A-N and corresponding shader engines 340A-N which are implemented on the underlying circuitry (e.g., single-instruction, multiple-data (SIMD) units) of the chiplet, with the number of geometry and shader engines varying according to the implementation. In one implementation, each chiplet 320A-N includes a pair of corresponding geometry engines 330A-N and corresponding shader engines 340A-N. For example, chiplet 320A includes geometry engines 330A-B and shader engines 340A-B and chiplet 320N includes geometry engines 330M-N and shader engines 340M-N. Chiplets 320A-N can also include any number and type of other components which are not shown to avoid obscuring the figure. In another implementation, each chiplet 320A-N includes a single geometry engine 330 coupled to a single shader engine 340. In other implementations, each chiplet 320A-N includes other numbers of geometry-shader engine pairs.

In one implementation, each of geometry engines 330A-N is a geometry front-end with at least a vertex shader and a hull shader that operate on high order primitives such as patches that represent a three-dimensional (3D) model of a scene. In this implementation, the geometry front-end provides the high order primitives to a corresponding shader engine 340A-N which generates lower order primitives from the higher order primitives. The lower order primitives are then replicated, shaded, and/or sub-divided before being processed by pixel engines. The pixel engines perform culling, rasterization, depth testing, color blending, and the like on the primitives to generate fragments or pixels for display. While chiplets 320A-N are shown as including geometry engines 330A-N and shader engines 340A-N, respectively, it should be understood that this is merely representative of one arrangement for partitioning graphics rendering functionality. Other arrangements of engines, modules, shaders, circuitry and/or processing elements to perform graphics rendering tasks are possible and are contemplated.

In one implementation, when a draw call is initiated on GPU 300, chiplets 320A-N are notified of the draw call and the location and size of index buffer 360 which includes the indices corresponding to one or more graphics objects of the draw call. Index buffer 360 can be stored in any number and type of memory devices accessible by chiplets 320A-N. In one implementation, index buffer 360 includes a list of pointers to vertices of graphics primitives that make up the graphics object(s). The graphics primitives can be, but are not limited to, points, lines, triangles, rectangles, patches, and so on.

In response to receiving the notification of the initiation of the draw call, each chiplet 320A-N calculates which indices to process from index buffer 360. Then each chiplet 320A-N fetches and processes indices independently and in parallel with other chiplets 320A-N fetching and processing their corresponding portions of index buffer 360. In one implementation, the chiplets 320A-N fetch indices a primitive group at a time in a round-robin fashion, resulting in an interleaving arrangement of portions of indices of index buffer 360 mapped to chiplets 320A-N. This allows chiplets 320A-N to process different portions of a draw call independently and in parallel with each other. This distributed geometry processing scheme relies on each chiplet 320A-N determining which portion(s) of the draw call to process without relying on a central distributor of work that dispenses work to the chiplets 320A-N. In other words, each chiplet knows where in index buffer 360 the previous chiplet left off and where the next chiplet will pick up again.

In one implementation, based on the distributed geometry processing scheme, each geometry engine 330A-N determines which portions of index buffer 360 to process. This determination step is performed independently by each geometry engine 330A-N. For example, geometry engine 330A calculates which different portions of index buffer 360 to process, starting with portion 365A and any number of other portions of index buffer 360. Similarly, geometry engine 330B calculates which different portions of index buffer 360 to process, starting with portion 365B and any number of other portions of index buffer 360, while geometry engines 330M-N process portions 365M-N, respectively, and any other portions until the entirety of index buffer 360 has been processed.

In one implementation, the different portions are specified using an offset (i.e., a pointer) and a range (i.e., a number of indices) in entries in tables 335A-N by geometry engines 330A-N. Table 335A is expanded to show one example of a table for specifying the offsets and ranges of the portions of index buffer 360 that geometry engine 330A has calculated are to be processed locally by geometry engine 330A. Alternatively, in another implementation, the portions that are to be processed by geometry engine 330A are indicated using an initial offset, a stride, and a range. For example, for the entries shown in table 335A, the initial offset would be 0, the stride would be 400, and the range would be 100. Other ways of encoding and/or storing the information used for fetching indices from index buffer 360 by geometry engines 330A-N are possible and are contemplated.

In one implementation, each geometry engine 330A-N has a separate logical ID which determines how it calculates the different portions of index buffer 360 to be processed. For example, if there are four geometry engines 330A-N, and the number of indices to be processed per portion is 100, then geometry engine 330A would process indices 0-99, geometry engine 330B would process indices 100-199, geometry engine 330C would process indices 200-299, geometry engine 330D would process indices 300-399, geometry engine 330A would process indices 400-499, geometry engine 330B would process indices 500-599 and so on until the end of index buffer 360 is reached. In one implementation, the number of indices per portion is determined based on the size of a primitive group. The size of a primitive group depends on the primitive type. Since each geometry engine 330A-N calculates its own indices to process independently of the other geometry engines, each geometry engine 330A-N can perform its own processing independently of the other geometry engines. This allows geometry engines 330A-N to work in parallel with each geometry engine performing work without waiting for messages, barriers, or other synchronization events.

Depending on the implementation and the primitive type, index buffer 360 can be pre-processed prior to being processed by geometry engines 330A-N. In one implementation, if the primitive type is a triangle list, then index buffer 360 is not pre-processed. In another implementation, if the primitive type is a strip primitive, then index buffer 360 is pre-processed to locate the reset indices and convert the strip primitive into a triangle list. In a further implementation, a strip primitive is processed in parallel by having all of the geometry engines 330A-N fetch the entire index buffer 360. In a still further implementation, conversion of a strip primitive into a triangle list is not performed when it is determined that the winding order is not important or if reset indices are known to not be present. In one implementation, a compute shader pre-processes a strip primitive into a triangle list which is then processed by geometry engines 330A-N. Other types of pre-processing steps and/or conversions of the indices in index buffer 360 are possible and are contemplated.

Figure 4:
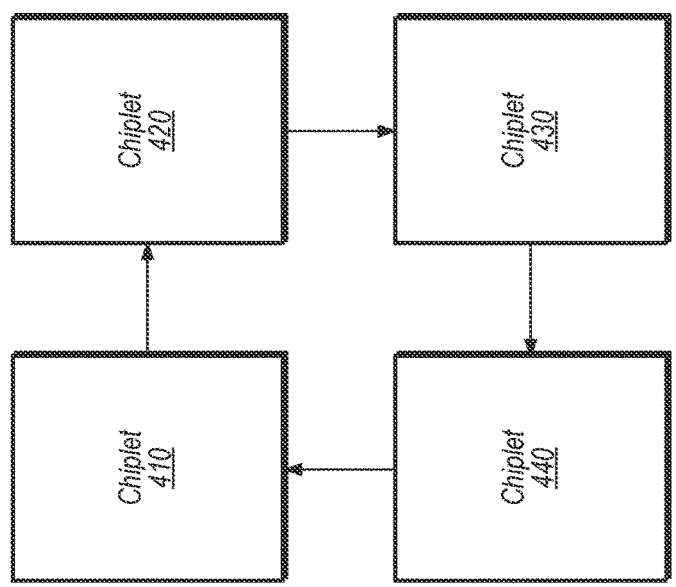
FIG. 4 is a block diagram of one implementation of a message passing scheme for a chiplet GPU.

Turning now to FIG. 4, a block diagram of one implementation of a message passing scheme for a chiplet GPU 400 is shown. As shown in FIG. 4, chiplet GPU 400 includes four chiplets 410, 420, 430, and 440. It should be understood that the example of chiplet GPU 400 having four chiplets is merely representative of one implementation. In other implementations, chiplet GPU 400 can have other numbers of chiplets while still using a similar message passing scheme.

In one implementation, chiplets 410, 420, 430, and 440 process a draw call, with the draw call including primitive types which result in message passing between the chiplets. For example, when a strip primitive is processed, chiplets 410-440 communicate the location of reset indices in one implementation. When chiplet 410 processes a first portion of an index buffer (e.g., index buffer 360 of FIG. 3), chiplet 410 sends, to chiplet 420, an indication of whether a reset index was found in the first portion. Similarly, when chiplet 420 processes a second portion of the index buffer, chiplet 420 sends, to chiplet 430, an indication of the presence of a reset index in the second portion. Also, chiplet 430 will send indications of reset indices in its index buffer portions to chiplet 440, and chiplet 440 will send indications of reset indices to chiplet 410 in index buffer portions processed by chiplet 440.

Figure 5:
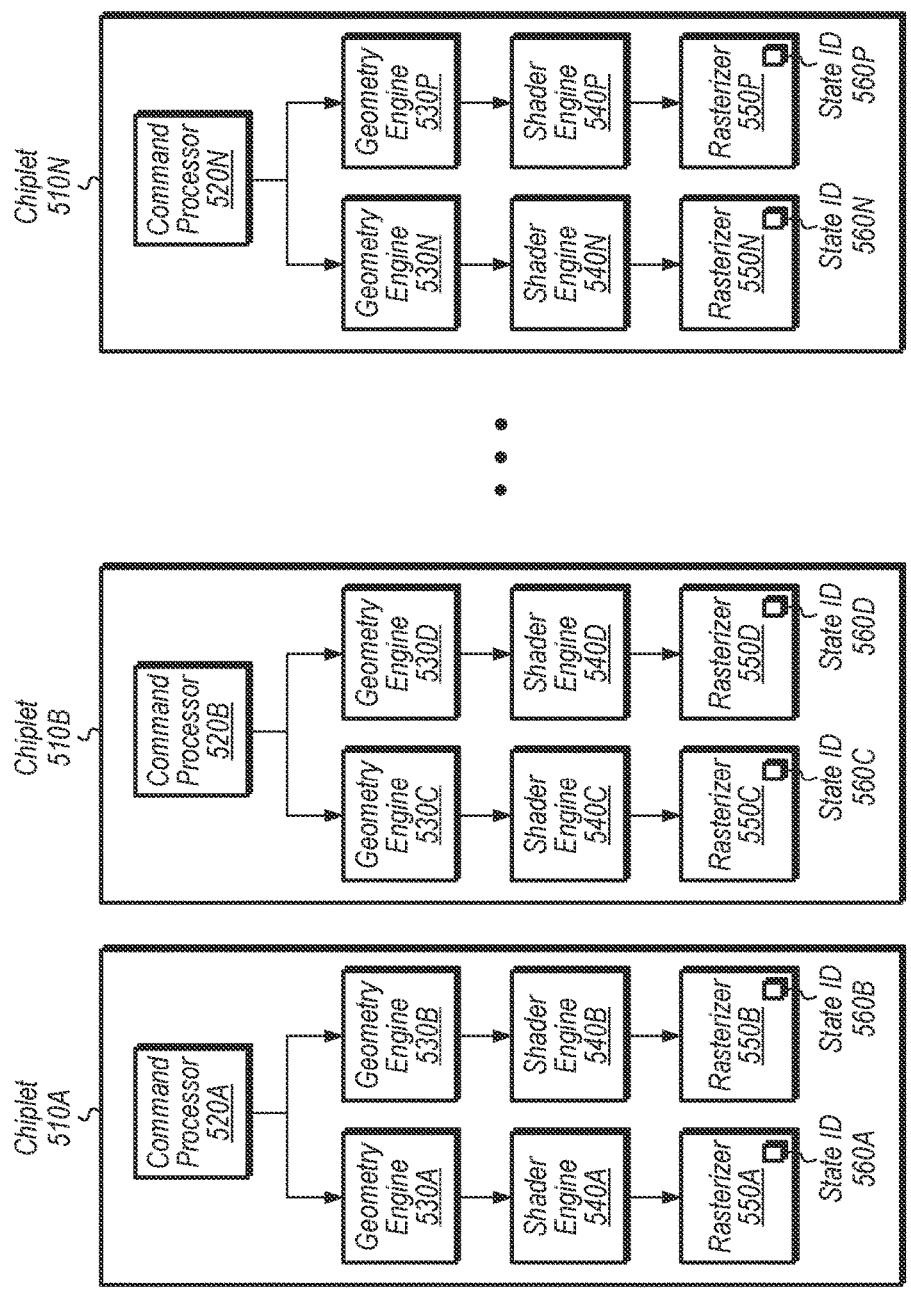
FIG. 5 is a block diagram of one implementation of a chiplet GPU.

Referring now to FIG. 5, a block diagram of another implementation of a chiplet GPU 500 is shown. As shown in FIG. 5, chiplet GPU 500 includes chiplets 510A-N which are representative of any number of chiplets. In one implementation, in order to keep chiplets 510A-N in synchronization when processing draw calls, chiplets 510A-N utilize a state management scheme. For example, in this implementation, for a given draw call, each command processor 520A-N generates a state ID 560A-P, respectively, for each corresponding pipeline. The pipeline refers to the various graphics processing stages implemented by each chiplet 510A-N. It is noted that the terms "state ID" and "context ID" can be used interchangeably herein.

In one implementation, each command processor 520A-N is coupled to two pipelines. For example, command processor 520A is coupled to a first pipeline with geometry engine 530A, shader engine 540A, and rasterizer 550A, and command processor 520A is coupled to a second pipeline with geometry engine 530B, shader engine 540B, and rasterizer 550B. Rasterizer 550A stores state ID 560A and rasterizer 550B stores state ID 560B in this implementation. It is noted that this is merely representative of one particular implementation. In other implementations, each command processor 520A-N is coupled to other numbers of pipelines.

Similar to command processor 520A, command processors 520B and 520N are coupled to two pipelines. For example, command processor 520C is coupled to a first pipeline with geometry engine 530C, shader engine 540C, and rasterizer 550C, and command processor 520D is coupled to a second pipeline with geometry engine 530D, shader engine 540D, and rasterizer 550D. Rasterizer 550C stores state ID 560C and rasterizer 550D stores state ID 560D in this implementation. Similarly, command processor 520N is coupled is coupled to a first pipeline with geometry engine 530N, shader engine 540N, and rasterizer 550N, and command processor 520N is coupled to a second pipeline with geometry engine 530P, shader engine 540P, and rasterizer 550P. Rasterizer 550N stores state ID 560N and rasterizer 550P stores state ID 560P in this implementation.

Each command processor 520A-N generates a state ID for a pipeline executing a given draw call independently of the other command processors and other pipelines. What this means is that for a particular draw call, chiplets 510A-N can have different state IDs 560A-P for the same draw call. The state ID 560A-P is passed through the pipeline and stored by rasterizers 550A-P. Rather than having each primitive being tagged with a state ID as the primitive passes through the pipeline, the primitive is associated with the state ID 560A-P stored by a corresponding rasterizer 550A-P.

In one implementation, rasterizers 550A-P perform shading operations and other operations such as clipping, perspective dividing, scissoring, and viewport selection, and the like. In various embodiments, the rasterizers 550A-P convert the scene geometry into screen space and a set of discrete picture elements. The virtual space geometry transforms to screen space geometry through operations that compute the projection of the objects and vertices from world space to the viewing window (i.e., viewport) of the scene that is made up of a plurality of discrete screen space pixels sampled by the rasterizers 550A-P. In one implementation, the rendering parameters applied by rasterizers 550A-P are associated with a corresponding state ID 560A-P and can change on a draw-call-by-draw-call basis.

It is noted that chiplets 510A-N may be implemented as separate semiconductor dies in one implementation. In another implementation, chiplets 510A-N represent different graphics processing pipelines that are implemented using one or more semiconductor dies. In other words, in this particular implementation, multiple pipelines may be located on the same semiconductor die. In this implementation, each chiplet 510A-N is representative of circuitry capable of performing a sequence of graphics rendering tasks. Similarly, the chiplets depicted in other figures in this disclosure can represent any type of circuitry and/or processing elements capable of performing the graphics rendering tasks described herein in parallel with the other collections of circuitry and processing elements.

Figure 6:
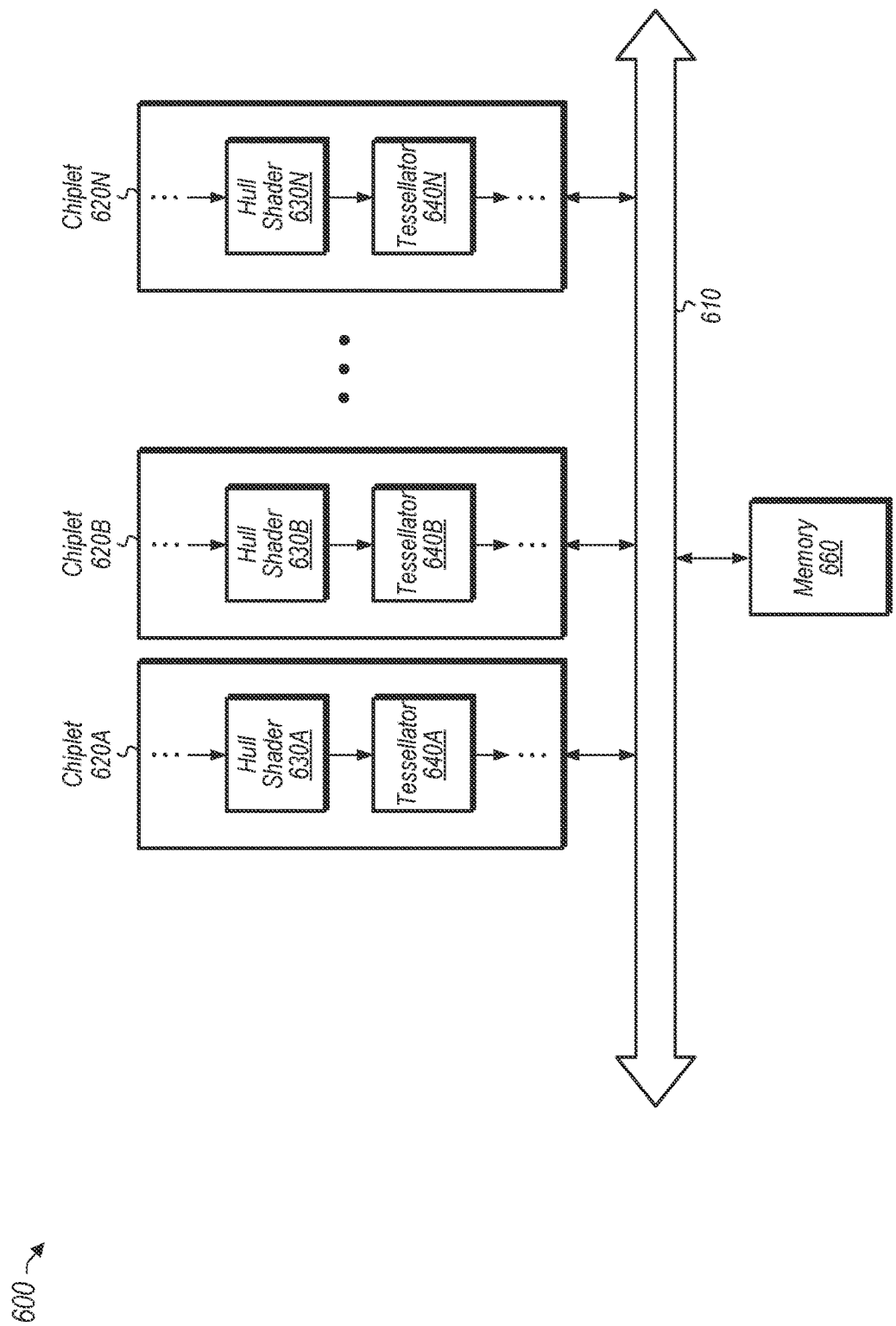
FIG. 6 is a block diagram of another implementation of a chiplet GPU.

Turning now to FIG. 6, a block diagram of another implementation of a chiplet GPU 600 is shown. As shown in FIG. 6, chiplet GPU 600 includes chiplets 620A-N which are representative of any number of chiplets. In one implementation, rather than having a centralized distributor of tessellation work, chiplet GPU 600 uses a distributed scheme for performing tessellation work on chiplets GPU 600. For example, in this implementation, hull shaders 630A-N calculate the average tessellation factor and send the average tessellation factor to tessellators 640A-N, respectively. The tessellators 640A-N then use the average tessellation factor to determine how many patches to process. It is noted that tessellators 640A-N can also be referred to as tessellation shaders. 640A-N or tessellation modules 640A-N.

Hull shaders 630A-N operate on input high-order patches or control points that are used to define the input patches, with a patch being a geometric shape (e.g., a rectangle, a triangle, a line). The hull shaders 630A-N output tessellation factors and other patch data. Primitives generated by the hull shaders 630A-N can be provided to the tessellators 640A-N which are tessellated based on tessellation factors provided by the hull shaders 630A-N. Tessellation subdivides input higher-order primitives such as patches into a set of lower-order output primitives that represent finer levels of detail. The tessellation factors specify the granularity of the primitives produced by the tessellation process. A model of a scene can therefore be represented by a smaller number of higher-order primitives (to save memory or bandwidth) and additional details can be added by tessellating the higher-order primitive.

In one implementation, hull shaders 630A-N determine the values of tessellation factors for each patch. For example, hull shaders 630A-N determine the screen space required to display a patch. The patch that is closer to a viewer requires more tessellation than the patch that is further away from a viewer. Moreover, the values of tessellation factors are proportional to the number of primitives that are generated for each patch. For example, the higher the values of tessellation factors the more primitives are generated for the patch. In one implementation, the number of tessellation factors depends on a type of a patch. For example, for a quad patch, a hull shader will compute six tessellation factors. The tessellation factors are used to determine how the quad patch may be divided into multiple triangles that form a mesh.

In one implementation, an input to a tessellator 640A-N includes a patch, and the tessellator 640A-N is programmed to tessellate the patch into a plurality of points. During subsequent stages of the graphics pipeline, the points may undergo further processing. For example, the points may be connected into primitives (e.g., triangles). Each tessellator 640A-N tessellates patches based on a tessellation factor for the patch. There can be any number of tessellation factors per patch. Based on these factors, each tessellator 640A-N breaks up the patch into numerous points, lines, or triangles based on the tessellation topology.

In one implementation, each tessellator 640A-N is responsible for determining how much work that it will consume and for determining how to fetch the appropriate number of tessellation factors from memory 660. Depending on the implementation, tessellators 640A-N can use different techniques to make the determination of how much work to consume. In one implementation, hull shaders 630A-N generate messages with average tessellation factors and then send these messages to all of the tessellators 640A-N on all chiplets 620A-N. For example, when a given hull shader 630A-N generates a done signal, the given hull shader 630A-N will send a message with the average tessellation factor to all tessellators 640A-N. Based on the message with the average tessellation factor, tessellators 640A-N fetch the tessellation factors and process a number of patches. In another implementation, rather than basing how many patches to process based on the average tessellation factor received in a message from a hull shader 630A-N, each tessellator 640A-N fetches all of the tessellation factors and then processes the patches based on an application setting. For example, if the application setting specifies ten patches, then tessellator 640A will process the first ten patches, tessellator 640B will process the second ten patches, and so on.

Figure 7:
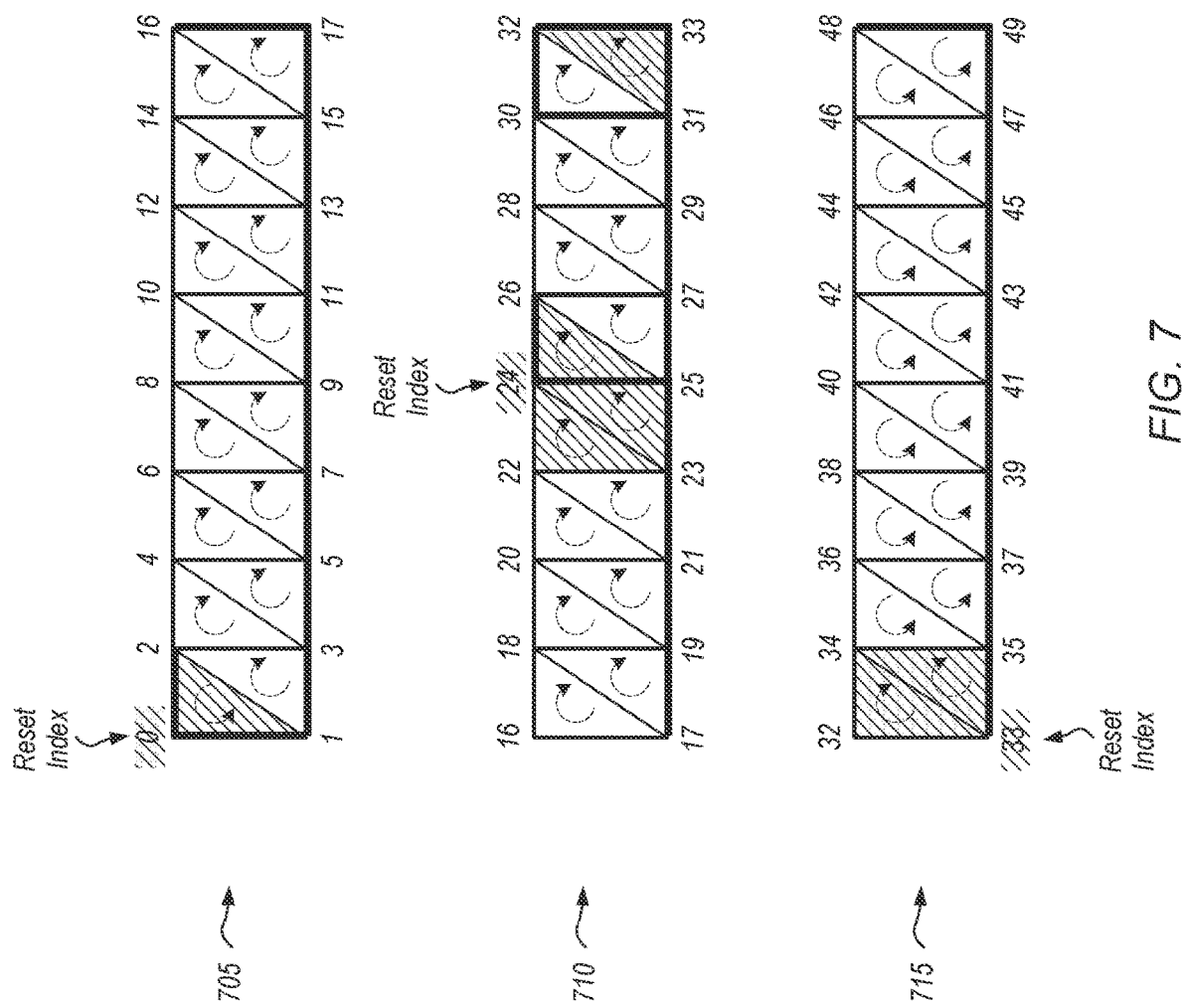
FIG. 7 includes diagrams of one implementation of how the winding order changes in triangle strips after hitting a reset index.

Referring now to FIG. 7, diagrams of how the winding order changes in a triangle strip after hitting a reset index in accordance with one implementation is shown. As shown in FIG. 7, an example of a draw with triangle strips for a system with three geometry engines is depicted. In one implementation, strip 705 is processed by a first geometry engine, strip 710 is processed by a second geometry engine, and strip 715 is processed by a third geometry engine. The shaded primitives are dropped due to the reset index, with a shaded number (in the index numbers above and below the strips 705, 710, and 715) indicating the location of the reset index. The dotted arc inside each primitive shows the winding order of the primitives. There is a change in the direction of the winding order after hitting a reset index in strip 705 and strip 715. For example, at index 1 in strip 705, the winding order changes from counter-clockwise to clockwise. Also, at index 34 in strip 715, the winding order changes from clockwise to counter-clockwise.

In another implementation, each geometry engine assumes, by default, that the reset index is disabled for lists. If the reset index is enabled for lists, the driver (e.g., driver 110 of FIG. 1) sends the entire draw to a single geometry engine. For strips, since each geometry engine processes all the primitives in the strip, the geometry engine adjusts the primitive ID and the winding order for all surviving primitives after a detected reset index. In a further implementation, the driver sends the entire draw to every geometry engine rather than to a single geometry engine. In this case, the entire index buffer would be fetched by each geometry engine and the geometry engine would drop primitives it does not own.

Turning now to FIG. 8, a diagram of one implementation of a tessellator-to-patch mapping table 800 is shown. Tessellator-to-patch mapping table 800 is one example of a mapping table for an implementation with four physical tessellators on four parallel processing units (i.e., one tessellator per parallel processing unit). In other implementations, a parallel processing unit can have other numbers of tessellators. Physical tessellator ID field 810 indicates the physical ID of each tessellator, with the four tessellators having physical IDs of 0, 1, 2, and 3. The tessellator which is the first to be assigned patches for processing is deemed the parent tessellator with a logical tessellator ID of 0 as shown in column 815 of table 800 for the tessellator with a physical ID of 1. This results in a reordering of logical tessellator IDs for the other tessellators based on their order in the sequence from the parent tessellator. It is assumed for the purposes of this discussion that the number of patches per tessellator has been calculated as six. In other implementations, the number of patches per tessellator can take on other values (e.g., 4, 8, 10, 15).

The parent tessellator, corresponding to the second row of table 800, calculates for itself that it is to process patches 0-5. The next tessellator with logical ID of 1 determines that it will process the next batch of patches 6-11. In a similar manner, tessellators with logical IDs of 2 and 3 will process patches 12-17 and 18-23, respectively. It is assumed for the purposes of this discussion that there are 32 patches per threadgroup. However, this is merely an example of one implementation. In other implementations, there can be other numbers of patches per threadgroup. For table 800, assuming 32 patches per threadgroup, the final two groupings of patches 24-29 and 30-31 are processed by tessellators with logical IDs of 0 and 1, respectively. This is generated based on a wrap-around of mapping tessellators to patches since there are more patches per threadgroup than can be processed with a single pass through the four tessellators. It is noted that table 800 provides the mapping for a single threadgroup. It should be understood that each threadgroup can have a different mapping of tessellators to patches.

Figure 10:
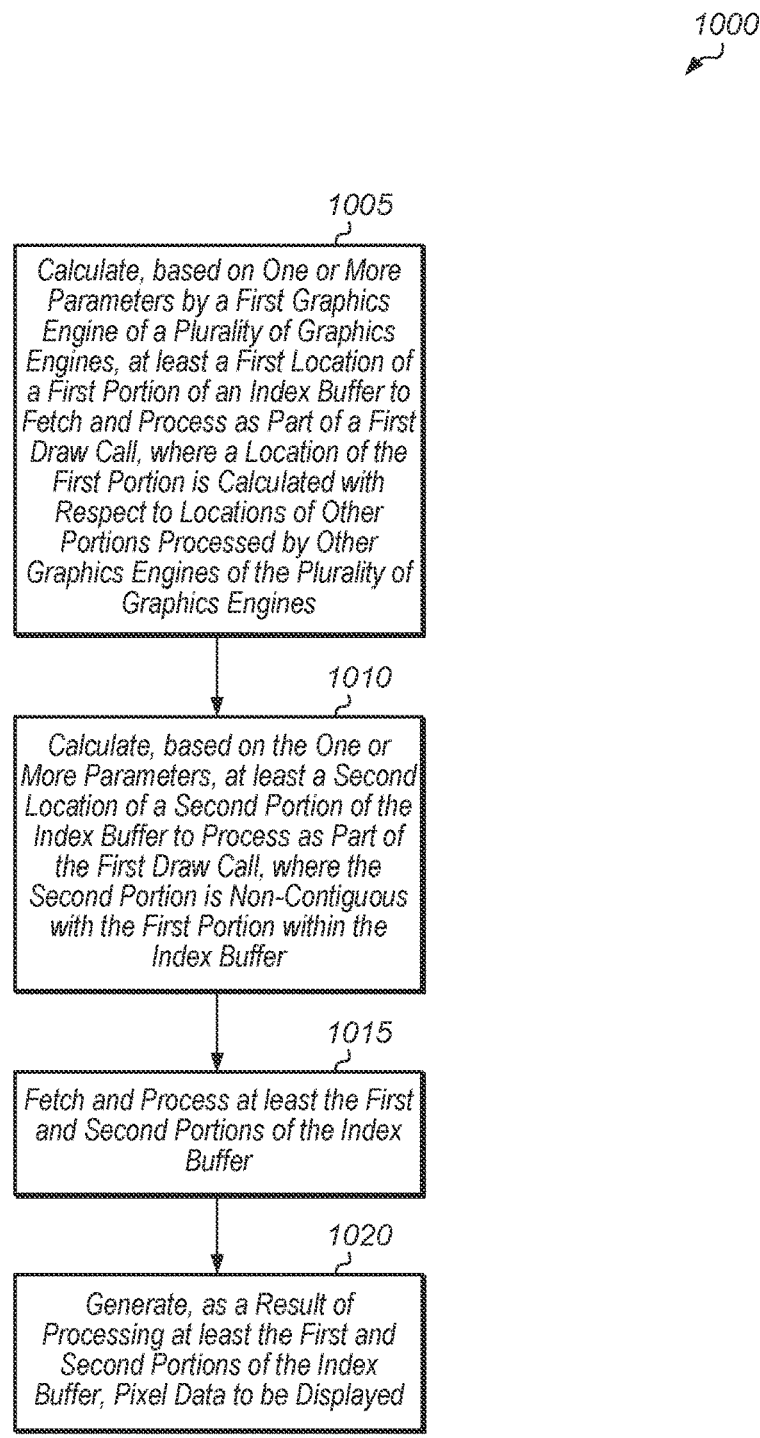
FIG. 10 is a generalized flow diagram illustrating one implementation of a method for calculating which non-contiguous portions of an index buffer to process by a geometry engine.
Figure 11:
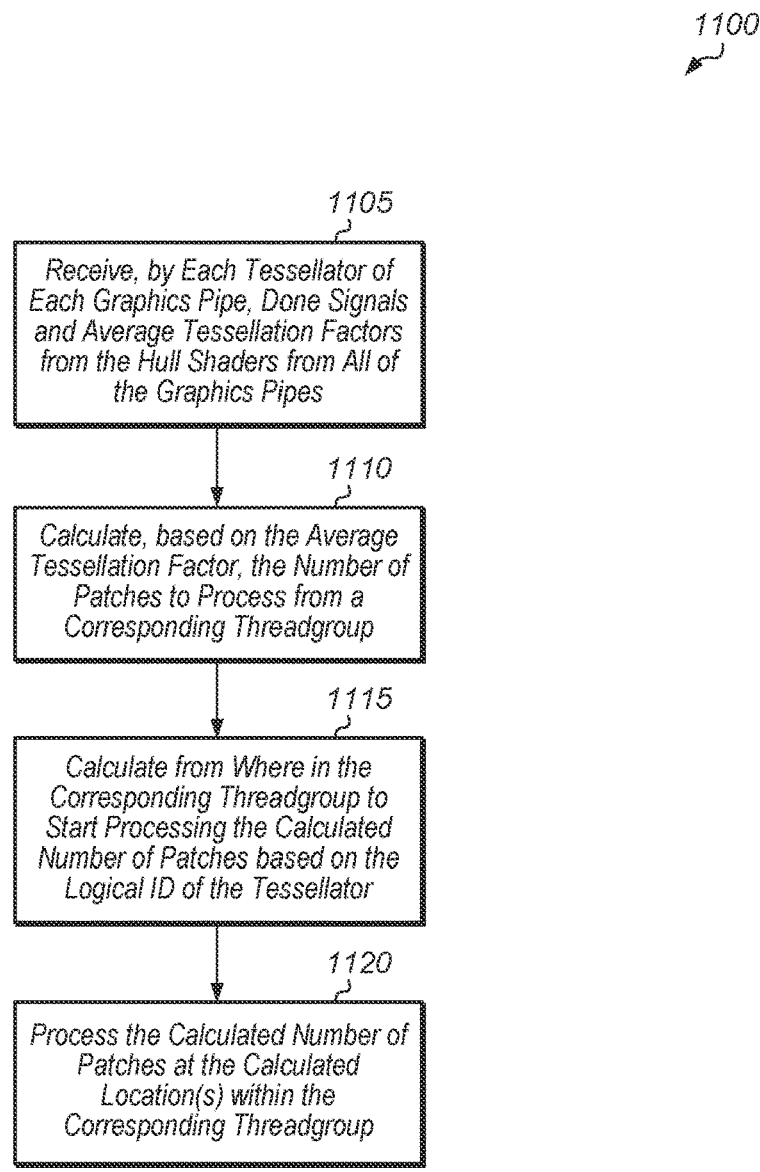
FIG. 11 is a generalized flow diagram illustrating one implementation of a method for tessellators performing distributed processing without a centralized controller.

Referring now to FIG. 9, one implementation of a method 900 for performing distributed geometry work without a central distributor is shown. For purposes of discussion, the steps in this implementation and those of FIG. 10-11 are shown in sequential order. However, it is noted that in various implementations of the described methods, one or more of the elements described are performed concurrently, in a different order than shown, or are omitted entirely. Other additional elements are also performed as desired. Any of the various systems or apparatuses described herein are configured to implement method 900 (and methods 1000-1100).

A first geometry engine, of a plurality of geometry engines, receives an indication of a draw call being initiated along with an address and size of an index buffer corresponding to a graphics object of the draw call (block 905). The first geometry engine calculates which portions of the index buffer to fetch based on one or more parameters (block 910). For example, the one or more parameters can include the total number of geometry engines which are processing the draw call, the logical geometry engine ID of the first geometry engine, the number of indices to fetch for each portion, and/or other parameters. It is noted that the first geometry engine performs the calculation step in block 910 locally on the first graphic engine. In other words, the calculation step in block 910 is performed independently of and in parallel with the other geometry engines in at least one implementation. In one implementation, the portions, which the first geometry engine decides to fetch, are non-contiguous portions of the index buffer. In one implementation, identifications of the portions calculated in block 910 are stored in a table (e.g., table 335A of FIG. 3).

Next, the first geometry engine fetches the identified portions of the index buffer (block 915). Then, the first geometry engine processes the portions of the index buffer until the last identified portion has been processed (block 920). After block 920, method 900 ends. It is noted that multiple instances of method 900 can be performed by any number of geometry engine in parallel with each other.

Turning now to FIG. 10, one implementation of a method 1000 for calculating which non-contiguous portions of an index buffer to process by a geometry engine is shown. A first geometry engine, of a plurality of geometry engines, calculates, based on one or more parameters, at least a first portion of an index buffer to fetch and process as part of a first draw call, where a location of the first portion is calculated with respect to locations of other portions of the index buffer processed by other geometry engines of the plurality of geometry engines (block 1005). Depending on the implementation, the one or more parameters can include the total number of geometry engines which are processing the draw call, the logical geometry engine ID of the first geometry engine, the number of indices to fetch for each portion, and/or other parameters. The first geometry engine also calculates, based on the one or more parameters, at least a second portion of the index buffer to process as part of the first draw call, where the second portion is non-contiguous with the first portion within the index buffer (block 1010).

Next, the first geometry engine fetches and processes at least the first and second portions of the index buffer (block 1015). Then, the first geometry engine generates, as a result of processing at least the first and second portions of the index buffer, pixel data to be displayed (block 1020). After block 1020, method 1000 ends. It is noted that multiple instances of method 1000 can be performed by any number of geometry engine in parallel with each other.

Referring now to FIG. 11, one implementation of a method 1100 for tessellators performing distributed processing without a centralized controller is shown. Each tessellator, in each graphics pipe of multiple graphics pipes, receives done signals and average tessellation factors from the hull shaders from all of the graphics pipes (block 1105). For example, if there are 4 graphics pipes, then the tessellator in the first graphics pipe receives done signals and average tessellation factors from the hull shader in the first graphics pipe, from the hull shader in the second graphics pipe, from the hull shader in the third graphics pipe, and from the hull shader in the fourth graphics pipe. The other tessellators in the other graphics pipes similarly receive done signals and average tessellation factors from the hull shaders in all four pipes.

In response to receiving a done signal and an average tessellation factor from a given hull shader, each tessellator calculates the number of patches to process based on the average tessellation factor (block 1110). Also, each tessellator calculates from where in the corresponding threadgroup to start processing the calculated number of patches based on the logical ID of the tessellator (block 1115). For example, if a given tessellator has a logical ID of 1 out of 4 tessellators, then the given tessellator would start in the threadgroup at the point where the tessellator with logical ID of 0 finishes. In other words, the given tessellator would skip those patches which are intended to be processed by the logical ID 0 tessellator. For example, if each tessellator calculates that it should process 6 patches, the parent tessellator (i.e., the tessellator with logical ID of 0) would process patches 0-5, the tessellator with logical ID of 1 would process patches 6-11, the tessellator with logical ID of 2 would process patches 12-17, and the tessellator with logical ID of 3 would process patches 18-23. It is noted that the logical ID of a tessellator may be different from the physical ID of the tessellator. The logical ID of the tessellator refers to its location with respect to the parent tessellator for a given threadgroup. The parent tessellator refers to where this particular threadgroup originated. In one implementation, the parent tessellator for a given threadgroup is subsequent to the tessellator where the previous threadgroup finished. The mapping of logical ID to physical ID for tessellators can change for every threadgroup.

Next, each tessellator processes the calculated number of patches at the calculated location(s) within the corresponding threadgroup (block 1120). After block 1120, method 1100 ends. It is noted that method 1100 can be performed be each of the tessellators in response to receiving a done signal and average tessellation factor from one of the hull shaders.

In various implementations, program instructions of a software application are used to implement the methods and/or mechanisms described herein. For example, program instructions executable by a general or special purpose processor are contemplated. In various implementations, such program instructions are represented by a high level programming language. In other implementations, the program instructions are compiled from a high level programming language to a binary, intermediate, or other form. Alternatively, program instructions are written that describe the behavior or design of hardware. Such program instructions are represented by a high-level programming language, such as C. Alternatively, a hardware design language (HDL) such as Verilog is used. In various implementations, the program instructions are stored on any of a variety of non-transitory computer readable storage mediums. The storage medium is accessible by a computing system during use to provide the program instructions to the computing system for program execution. Generally speaking, such a computing system includes at least one or more memories and one or more processors configured to execute program instructions.

What is claimed is:

1. A processor comprising:
a plurality of geometry circuits;
wherein responsive to a draw call, each geometry circuit of the plurality of geometry circuits is configured to:
independently calculate a location of a portion of geometry data related to one or more graphics primitives of the draw call;
fetch the portion of the geometry data, based on the calculated location; and
process the fetched portion of the geometry data.

2. The processor as recited in claim 1, wherein each geometry circuit is configured to circuits independently determine the location of the portion of geometry data to be fetched, without coordination or communication with other geometry circuits of the plurality.

3. The processor as recited in claim 1, wherein each geometry circuit is configured to calculate a location of a portion of data to fetch based at least in part on one or more of a total number of geometry circuits processing the draw call, a logical geometry circuit identifier of each geometry circuit, or a number of indices to fetch for the draw call.

4. The processor as recited in claim 1, wherein a location calculated by a given geometry circuit is indicative of a portion of an index buffer associated with the draw call, wherein each of a plurality of indices of the index buffer corresponds to a distinct portion of data to be fetched for the draw call.

5. The processor as recited in claim 4, wherein the index buffer comprises a list of pointers that point to vertices corresponding to a plurality of graphics primitives that form one or more graphics objects corresponding to the draw call.

6. The processor as recited in claim 4, wherein a number of indices corresponding to a portion of data to be fetched, for each portion of the index buffer, is determined based at least in part on a size of a primitive group.

7. The processor as recited in claim 1, wherein a portion of data fetched by each geometry circuit corresponds to a non-contiguous portion of an index buffer.

8. A method comprising:
responsive to a draw call:
independently calculating, by each geometry circuit of a plurality of geometry circuits, a location of a portion of geometry data associated with one or more graphics primitives of the draw call;
fetching, by each geometry circuit, the portion of the geometry data based on the calculated location; and
processing, by each geometry circuit, the fetched portion of the geometry data.

9. The method as recited in claim 8, further comprising independently determining, by each geometry circuit, the location of the portion of geometry data to be fetched, without coordination or communication with other geometry circuits of the plurality of geometry circuits.

10. The method as recited in claim 8, further comprising calculating, by each geometry circuit, the location of the portion of data to fetch based at least in part on one or more parameters comprising a total number of geometry circuits processing the draw call, a logical geometry circuit identifier of each geometry circuit, a number of indices to fetch for the draw call, or a combination thereof.

11. The method as recited in claim 8, wherein the location calculated by each geometry circuit is indicative of a portion of an index buffer associated with the draw call, wherein each of a plurality of indices of the index buffer corresponds to a portion of data to be fetched for the draw call.

12. The method as recited in claim 11, wherein the index buffer comprises a list of pointers that point to vertices corresponding to a plurality of graphics primitives that form one or more graphics objects corresponding to the draw call.

13. The method as recited in claim 11, wherein a number of indices corresponding to a portion of data to be fetched, for each portion of the index buffer, is determined based at least in part on a size of a primitive group.

14. The method as recited in claim 8, wherein the portion of data fetched by a given geometry circuit corresponds to a non-contiguous portion of an index buffer.

15. A system comprising:
a memory configured to store data; and
a processor comprising a plurality of geometry circuits, wherein each geometry circuit is configured to:
calculate a memory address corresponding to a portion of data to be processed by the geometry circuit;
fetch the portion of data from the memory using the calculated memory address; and
process the portion of data;
wherein the geometry circuits are configured to perform the fetch and process without requiring coordination with other geometry circuits.

16. The system as recited in claim 15, wherein the portion of data comprises geometry data associated with one or more graphics primitives specified by a draw call.

17. The system as recited in claim 15, wherein each geometry circuit is configured to calculate a location of a portion of data based at least in part on one or more of a number of geometry circuits processing a draw call, a geometry circuit identifier of each geometry circuit, or a number of indices to fetch for the draw call.

18. The system as recited in claim 15, wherein a location calculated by a given geometry circuit is indicative of a portion of a buffer in the memory.

19. The system as recited in claim 16, wherein the buffer comprises a list of pointers that point to vertices corresponding to a plurality of graphics primitives that form one or more graphics objects corresponding to the draw call.

20. The system as recited in claim 15, wherein a portion of data fetched by each geometry circuit corresponds to a non-contiguous portion of an index buffer.

* * * * *